(12) United States Patent
Lam

(10) Patent No.: US 6,978,442 B2
(45) Date of Patent: Dec. 20, 2005

(54) AUDITING DATA USING OBSERVABLE AND OBSERVER OBJECTS

(75) Inventor: Thanh V. Lam, Hurley, NY (US)

(73) Assignee: International Business Machines Corporation, Armonk, NY (US)

( * ) Notice: Subject to any disclaimer, the term of this patent is extended or adjusted under 35 U.S.C. 154(b) by 850 days.

(21) Appl. No.: 09/848,291

(22) Filed: May 3, 2001

(65) Prior Publication Data

US 2002/0165878 A1 Nov. 7, 2002

(51) Int. Cl.$^7$ .............................................. G06F 9/44
(52) U.S. Cl. ...................................................... 717/127
(58) Field of Search ............................... 717/127–131, 717/116, 120

(56) References Cited

U.S. PATENT DOCUMENTS

| | | | |
|---|---|---|---|
| 3,774,164 A | 11/1973 | Osterberg et al. ........ 340/172.5 |
| 3,974,496 A | 8/1976 | Aptroot-Soloway ........ 340/337 |
| 5,896,530 A | 4/1999 | White ........................ 395/671 |
| 5,946,693 A * | 8/1999 | Mizuyama et al. ..... 707/103 R |
| 6,304,893 B1 * | 10/2001 | Gish .......................... 709/203 |
| 6,308,226 B1 * | 10/2001 | Kainuma .................... 719/316 |
| 6,424,991 B1 * | 7/2002 | Gish .......................... 709/203 |
| 6,681,383 B1 * | 1/2004 | Pastor et al. ............... 717/126 |
| 6,697,103 B1 * | 2/2004 | Fernandez et al. ......... 348/143 |
| 6,754,704 B1 * | 6/2004 | Prorock ..................... 709/224 |

OTHER PUBLICATIONS

"Multiple Entry With Immediate Verification", IBM Technical Disclosure Bulletin, vol. 36, No. 08, Aug. 1993, p. 227.
"Class Observable" and "Interface Observer", 5 pages printed from the Internet on Apr. 25, 2001 at URL:http://java.sun.com/j2se/1.3/docs/api/index.html.

* cited by examiner

Primary Examiner—Wei Y. Zhen
(74) Attorney, Agent, or Firm—Lawrence D. Cutter, Esq.; Kevin P. Radigan, Esq.; Heslin Rothenberg Farley & Mesiti, P.C.

(57) ABSTRACT

An observable object represents a feature to be audited. The observable object provides a decentralized location that includes logic responsible for auditing its own data. Should the audit detect a change in the data, a modifier object is created, which includes modify logic to accommodate the change. The modifier object is added to a pool of modifier objects, and at the appropriate time, one or more observers retrieve the modifier object and run the modify logic.

51 Claims, 8 Drawing Sheets

```
IF (CUSTOMER_ID !=BLANK) THEN
  IF (NAME !=BLANK) THEN
    IF (ADDRESS !=BLANK) THEN
      IF (CITY !=BLANK) THEN
        IF (STATE !=BLANK) THEN
          IF (ZIP_CODE !=BLANK) THEN
            CALL PROCESS_FORM
          END IF
        END IF
      END IF
    END IF
  END IF
END IF
``` fig. 3A

```
IF (CUSTOMER_ID !=BLANK) && CUSTOMER_ID IS NUMERIC) THEN
  IF (NAME !=BLANK) && NAME HAS TWO PARTS) THEN
    IF (ADDRESS !=BLANK) && ADDRESS STARTS WITH NUMBER) THEN
      IF (CITY !=BLANK) && CITY IS VALID) THEN
        IF (STATE !=BLANK) && STATE IS VALID) THEN
          IF (ZIP_CODE !=BLANK) && ZIP_CODE IS NUMERIC) THEN
            CALL PROCESS_FORM
          END IF
        END IF
      END IF
    END IF
  END IF
END IF
``` fig. 3B

OBSERVABLE OBJECT FOR CUSTOMER_ID

```
AUDIT( ) {

IF BLANK THEN
        DO NOT SEND TO POOL
    ENDIF

IF NUMERIC THEN
        PROCESS_FIELD( )
    ENDIF

}
```

AUDITING DATA USING OBSERVABLE AND OBSERVER OBJECTS

TECHNICAL FIELD

This invention relates, in general, to data audit and verification, and in particular, to using decentralized objects to audit the data and to handle changes to the data.

BACKGROUND ART

Data verification can be a complex and tedious task requiring the use of complicated conditional logic. For example, in order to verify the fields of a data entry form, each field has to be verified. Since each field has its own rules for verifying or auditing its entered data, conditional logic (e.g., if-then-else statements) is needed for each and every field to be audited. As the number of fields to be audited increases, so does the complexity of the conditional logic. Similarly, as the number of conditions to be tested for each field increases, so does the complexity of the conditional logic.

Previously, the conditional logic used for the various fields of a form has been combined into a central location (e.g., an application) that runs through the logic serially. This suffers from complexity, as well as performance degradation.

Based on the foregoing, a need exists for a capability that facilitates the auditing and verifying of fields of a data entry form. Further, a need exists for a capability that facilitates the auditing and verifying of other features. In particular, a need exists for a capability that replaces the complex and confusing conditional logic typically used to verify or audit data. A need exists for a capability that decentralizes and automates the verification process.

SUMMARY OF THE INVENTION

The shortcomings of the prior art are overcome and additional advantages are provided through the provision of a method of auditing data of data entry forms. The method includes, for instance, providing an observable object for a field of a data entry form to be audited, the observable object including logic to be used for auditing data of the field; and auditing data of the field using the observable object.

In a further aspect of the invention, a method of auditing data of a data entry form is provided. The method includes, for instance, providing an observable object for a field of the data entry form to be audited, the observable object including logic to be used for auditing data of the field; auditing data of the field using the observable object; building a modifier object for the field, when the auditing indicates that a change has occurred in the data; forwarding the modifier object to a pool of one or more modifier objects; informing an observer that the modifier object has been added to the pool of one or more modifier objects; retrieving, by the observer, the modifier object from the pool; and running, by the observer, a modify method of the modifier object to accommodate the change in the data.

In yet a further aspect of the present invention, a method of auditing data of components of a self-monitoring framework is provided. The method includes, for instance, providing an observable object for each component of a plurality of components of multiple components of the self-monitoring framework to be audited, each observable object including logic to be used for auditing data of its associated component; and auditing data of the each component using the observable object corresponding to that component.

System and computer program products corresponding to the above-summarized methods are also described and claimed herein.

Advantageously, a capability is provided that facilitates the auditing of data. In one example, the capability provides a decentralized and automated technique for providing data verification. The capability advantageously combines the Model-View-Control object-oriented methodology with observable objects and modifier object pooling for observer auditing. This provides a simplified and straight forward capability for auditing data that is flexible and extendable.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 3a–3b depict examples of conventional conditional logic used to audit the fields of FIG. 2;

BEST MODE FOR CARRYING OUT THE INVENTION

In accordance with an aspect of the present invention, data is audited using observable objects, which include auditing logic. When the auditing logic of a particular observable object detects that a specified event, such as a change in the data, has occurred, then a modifier object is automatically created, which includes the logic for accommodating the specified event. The modifier object is added to a pool of objects, and it is the responsibility of an observer to retrieve the modifier object and execute its logic. The data to be audited can be associated with a variety of features, including but not limited to, fields within data entry forms or components of a self-monitoring framework.

Figure 1:
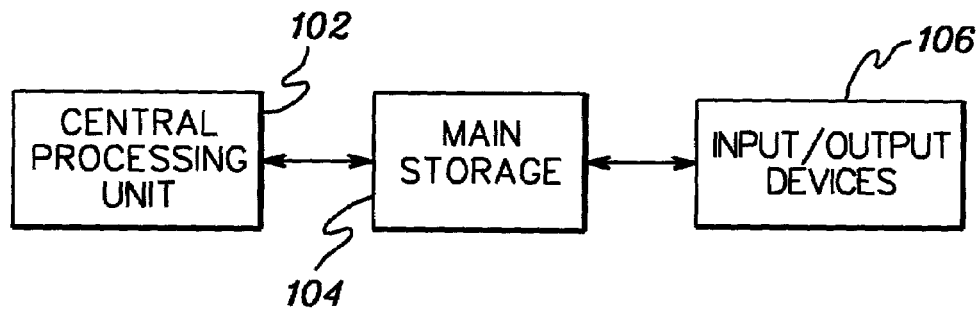
FIG. 1 depicts one example of a computing environment incorporating and using aspects of the present invention.

One example of a computing environment incorporating and using aspects of the present invention is depicted in FIG. 1. In one example, a computing environment 100 includes, for instance, at least one central processing unit (CPU) 102, a main storage 104, and one or more input/output devices 106, each of which is described below.

As is known, central processing unit 102 is the controlling center of the computing environment and provides the sequencing and processing facilities for instruction execution, interruption action, timing functions, initial program loading and other machine related functions. The central processing unit executes at least one operating system used to control the operation of the computing environment by controlling the execution of other programs, controlling communication with peripheral devices and controlling use of the computer resources.

Central processing unit 102 is coupled to main storage 104, which is directly addressable and provides for high-speed processing of data by the central processing unit. Main storage 104 may be either physically integrated with the CPU or constructed in stand-alone units.

Main storage 104 is also coupled to one or more input/output devices 106. These devices include, for instance, keyboards, communications controllers, teleprocessing devices, printers, magnetic storage media (e.g., tape, disks), direct access storage devices and sensor-based equipment. Data is transferred from main storage 104 to input/output devices 106, and from the input/output devices back to main storage.

In one example, computing environment 100 is a single system environment, which includes an RS/6000 computer system running an AIX operating system. (RS/6000 and AIX are offered by International Business Machines Corporation.) The invention is not limited to such an environment, however. The capabilities of the present invention can be incorporated and used within many types of computing environments and many types of computer systems. For instance, computing environment 100 can include a UNIX workstation running a UNIX-based operating system. Other variations are also possible and are considered a part of the claimed invention.

In yet another embodiment, computing environment 100 is a multisystem environment in which various computing units are coupled together via a connection, such as a wire connection, a token ring or network connection, to name just a few examples. Further, the computing environment may include a large parallel system with a plurality of units coupled to one another via a network connection, such as a switch. Again, the capabilities of the present invention are usable with many types of computing environments, as well as other types of communications systems.

Various features, including features of a computing environment, can be audited or verified, in accordance with an aspect of the present invention. For example, a data entry form may include one or more fields to be audited. That is, data associated with a field (e.g., input data or provided data) is verified. If the data has changed, then one or more specified actions are taken.

As a further example, the features may include a plurality of components of a self-monitoring framework. For example, one or more operating conditions of each component of the framework to be monitored are audited, and one or more specified actions are taken, if a specified event occurs.

Although data entry fields and components are provided herein as examples of features to be audited, the invention is not limited to those features. Aspects of the present invention are equally applicable to other features (which may or may not be associated with a computing environment), and those are therefore, considered within the scope of the present invention. Further details of the invention are described with reference to the remaining figures. Again, the examples focus on fields of a data entry form and components of a self-monitoring framework, but aspects of the invention are not limited to such examples.

Figure 2:
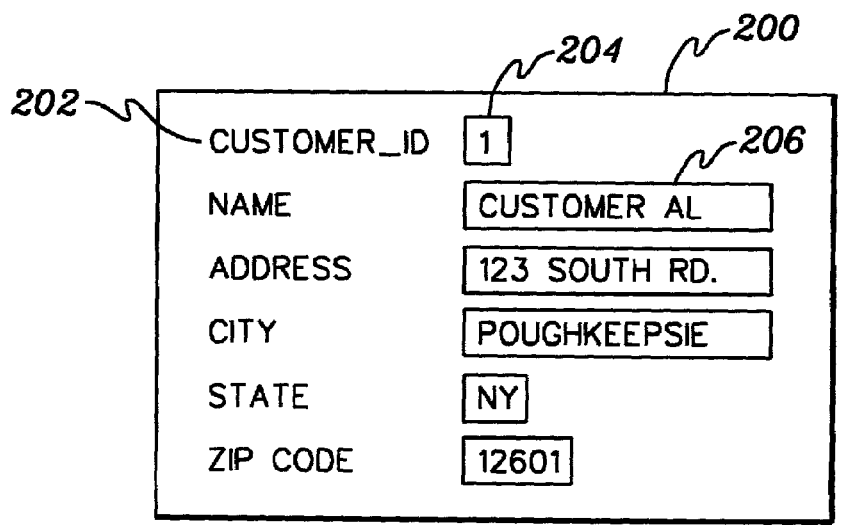
FIG. 2 depicts one embodiment of a data entry form including one or more fields to be audited, in accordance with an aspect of the present invention.

An example of a data entry form is depicted in FIG. 2. A data entry form 200 includes a plurality of features 202. In this example, the features are fields within the data entry form, and each field includes data that is to be audited. For example, a Customer$_{13}$ Id field includes data 204 that is to be audited. Likewise, a Name field includes data 206 that is to be audited, and so forth. Each of these fields typically has its own set of rules to follow. Thus, traditionally, in order to audit the data of each field, conditional logic (such as, if-then-else statements) specific to the field has been used to perform the audit (see, e.g., FIG. 3a).

As shown in FIG. 3a, the logic for each field is centrally located as part of an application that is responsible for performing the auditing. Thus, if there are ten fields, then there are ten conditional statements within the application for checking the fields of the data form. Each conditional statement has one or more conditions to test.

As the number of fields and/or the number of conditions to be tested increases, the more complex the conditional logic, as shown in FIG. 3b.

Figures 4, 5:
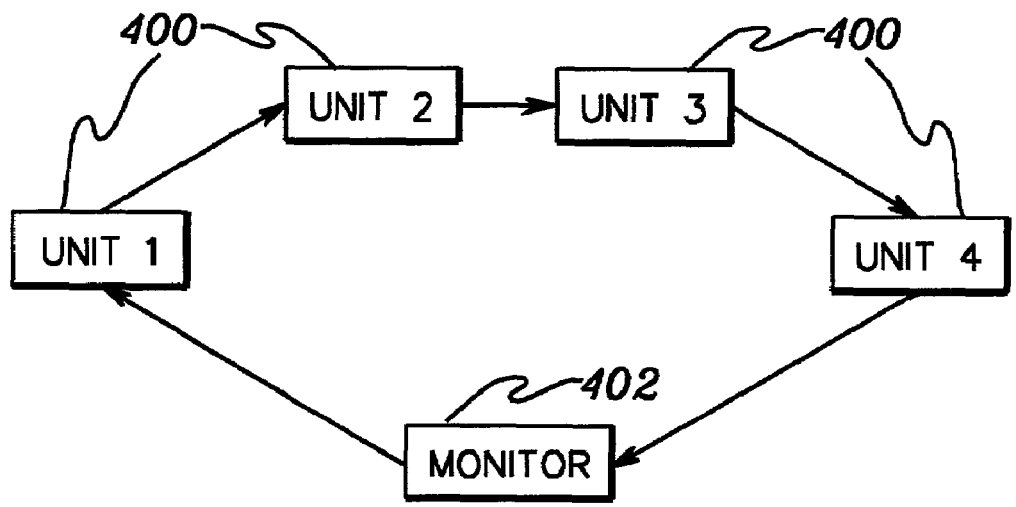
FIG. 4 depicts one embodiment of hardware units to be audited, in accordance with an aspect of the present invention.
FIG. 5 depicts one example of an observable object used in auditing the Customer_Id field of FIG. 2, in accordance with an aspect of the present invention.

In another embodiment, the features to be audited include components of a self-monitoring framework. In one example, each component is a hardware unit (e.g., a machine, a node of a computing environment, and/or other types of units) 400 (FIG. 4). The hardware units are coupled to one another, and one or more of those units are to be audited. The auditing includes checking one or more operating conditions of each unit to be audited. The operating condition(s) for each unit may be the same or different.

Previously, a central monitor 402 has been used to monitor the operating conditions of each unit. That is, the monitor is part of a monitoring loop that starts at a specified location and goes around the loop testing the operating or specified conditions. Thus, the monitor includes the auditing logic for each of the units to be monitored, which leads to complexity, reliance on a single monitoring component, and increased communication overhead.

In order to overcome deficiencies of previous techniques associated with auditing various features, including reducing the complexity of the auditing logic and decentralizing the auditing responsibility, each feature to be audited is represented by an observable object, in accordance with an aspect of the present invention. An example of an observable object is depicted in FIG. 5. In FIG. 5, an observable object 500 corresponds to the Customer_Id field of FIG. 2. There would be one such observable object for each field or feature to be audited. Each observable object has its own audit method 502, which reads the data associated with its corresponding feature and performs the auditing, checking and verifying, as appropriate. No other object knows about the data of this object's feature. The observable object provides a decentralized location for the auditing logic, which is associated with its particular feature to be audited.

One embodiment of the logic associated with using observable objects to audit a feature is described with reference to FIGS. 6a and 6b. In one example, this logic is implemented using object-oriented programming concepts, such as available with JAVA. However, other object-oriented concepts, as well as other programming concepts, may be used to implement aspects of the present invention.

Figure 6A:
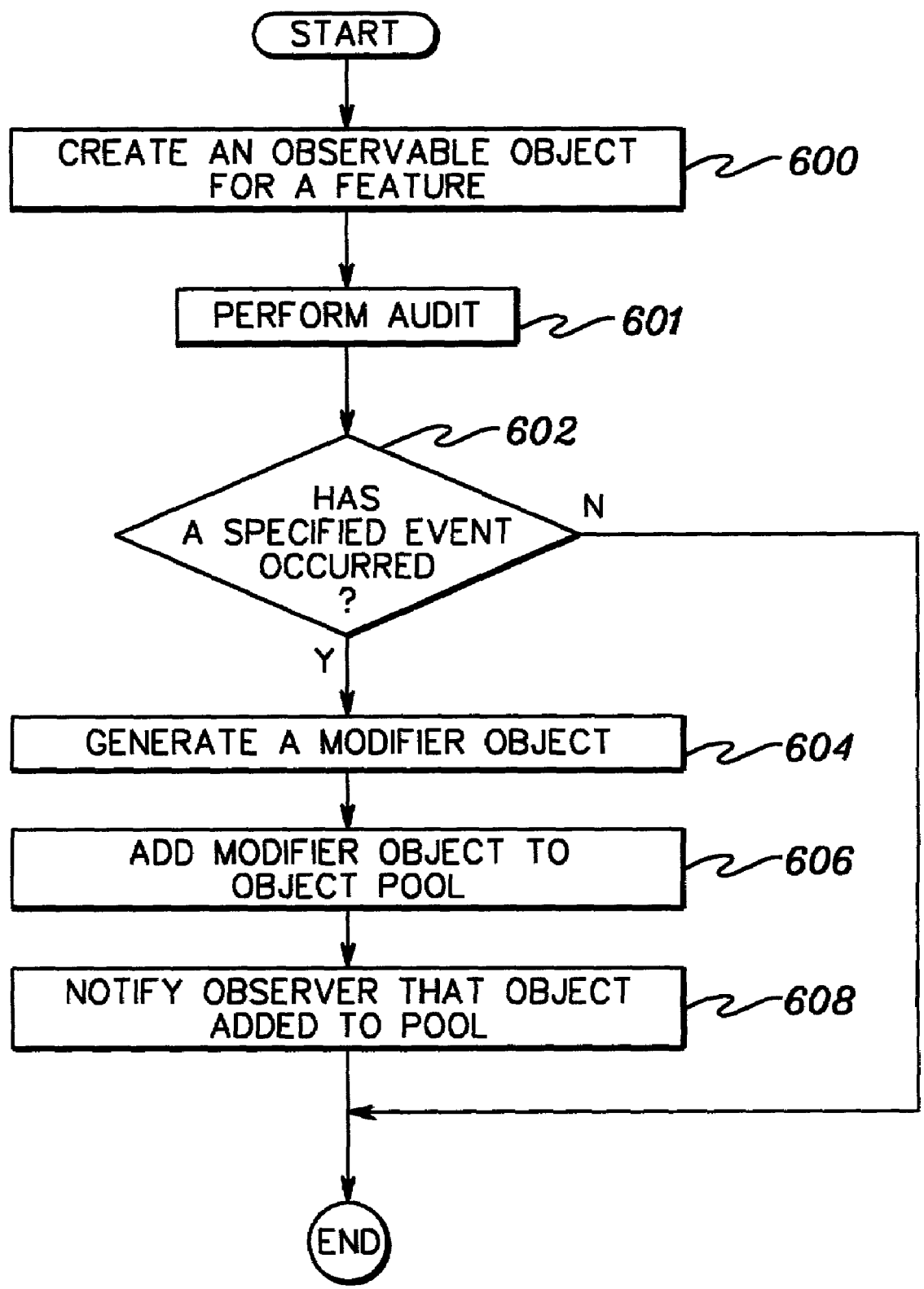
FIG. 6a depicts one embodiment of the logic associated with using an observable object to audit a feature, in accordance with an aspect of the present invention.

Referring to FIG. 6a, in order for a feature to be audited, initially, an observable object is created for the feature, STEP 600. The manner in which an observable object is created is known in the art. However, information regarding observable objects can be found, for instance, at the URL of http://java.sun.com/j2se/1.3/docs/api/index.html, the contents of which are hereby incorporated herein by reference in their entirety.

Subsequent to creating the observable object for the particular feature, the observable object is used to perform an audit, STEP 601. The audit includes checking or verifying aspects of the data, as desired. If the audit should fail, an error message is placed in the status area. Otherwise, processing continues.

In particular, a determination is made as to whether a specified event has occurred, INQUIRY 602. For example, if the feature is a field, a determination is made as to whether the data of the particular field associated with this observable object has changed, as indicated by the audit. If the specified event has occurred, then a modifier object is automatically generated, STEP 604.

Figure 7:
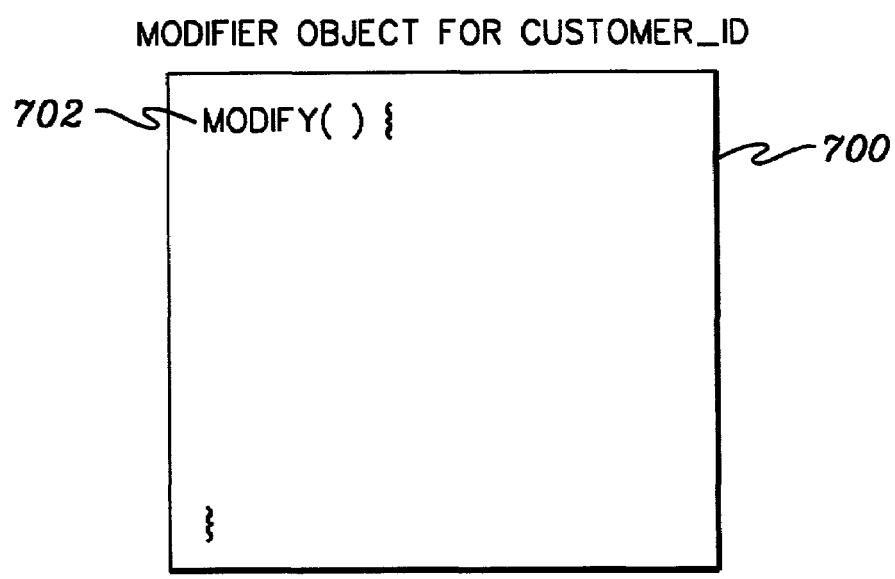
FIG. 7 depicts one example of a modifier object created for the Customer_Id field of FIG. 2, in accordance with an aspect of the present invention.

One example of a modifier object 700 is depicted in FIG. 7. The modifier object is instantiated from a class extending a modifier interface. Hence, each modifier object has a modify method 702. The modify method includes the logic to accommodate the event that has occurred. For example, if a change has been made to the data of a field, then that change is propagated to a storage medium, such as a database. Other or different actions can also be taken.

Referring back to FIG. 6a, subsequent to generating the modifier object, the modifier object is added to a pool of one or more modifier objects, STEP 606. As examples, this may include adding the modifier object to a queue, a stack, a linked list or a hash table. This allows one or more observers of the observable object to be notified that the object has been added to the pool, STEP 608. An observer is, for instance, an object that implements an interface observer. An observer is notified, for example, by the observable's notifyObservers method.

Returning to INQUIRY 602, if a specified event has not occurred, then no modifier object is created and the process is complete.

The logic of FIG. 6a is performed for each feature to be audited. That is, each feature has its own observable object with its own auditing logic.

Figure 6B:
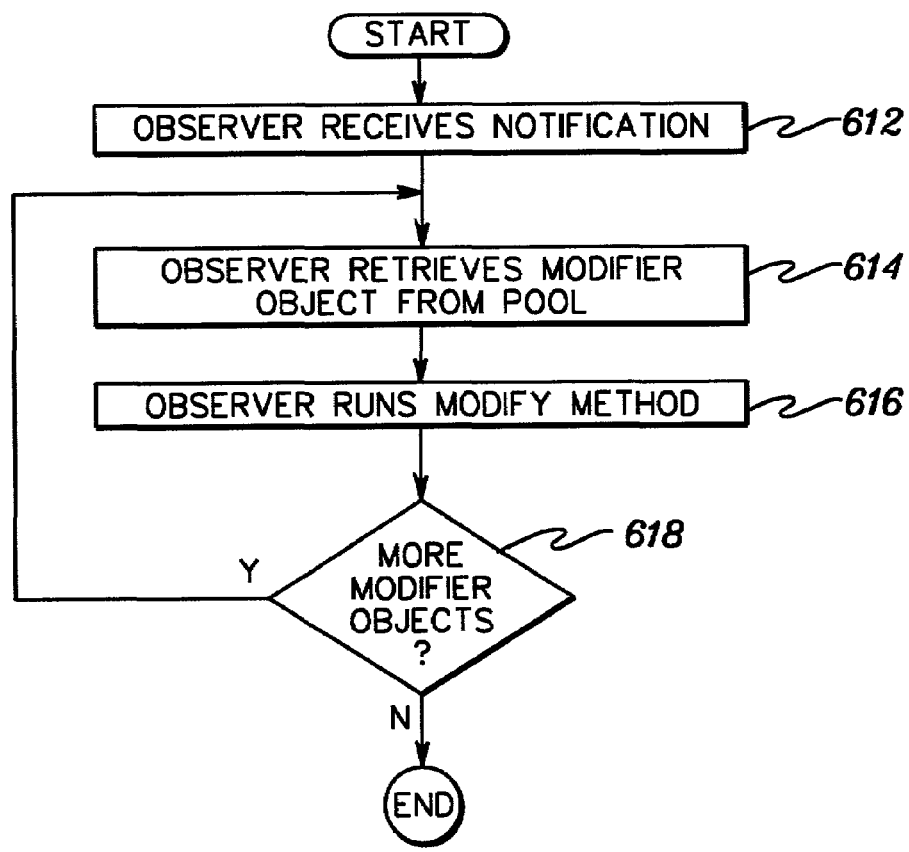
FIG. 6b depicts one embodiment of the logic used to accommodate an event associated with an observable object, in accordance with an aspect of the present invention.

Referring now to FIG. 6b, when an observer receives notification that the object has been added to the pool, STEP 612, the observer has the ability to retrieve the modifier object from the pool, STEP 614. When the observer retrieves the modifier object from the pool, the observer runs the modify method to accommodate the event that has taken place, STEP 616. For example, changed data is written to a database.

Subsequently, in one example, the observer determines whether there are more modifier objects in the pool, INQUIRY 618. If so, then another modifier object is retrieved, STEP 614. Otherwise, the processing ends. (In another embodiment, the observer retrieves only one object at each notification.)

In one embodiment, a plurality of observers are notified. Thus, the observers collaborate with one another, in order to avoid executing the modify method multiple times. However, in another embodiment, no such collaboration may be desired.

Further, in one example, if there is a certain order to be followed in the processing of the observer objects, then some scheme of number association can be tagged to each modifier object. This enables the observer to retrieve the objects from the pool in the specified order.

The observer can retrieve the modifier object and run its modify method anytime after the retrieval. Further, in one embodiment, the observer can wait for a plurality of modifier objects to be placed in the pool before it starts to retrieve the objects and run the modify methods.

Figure 8:
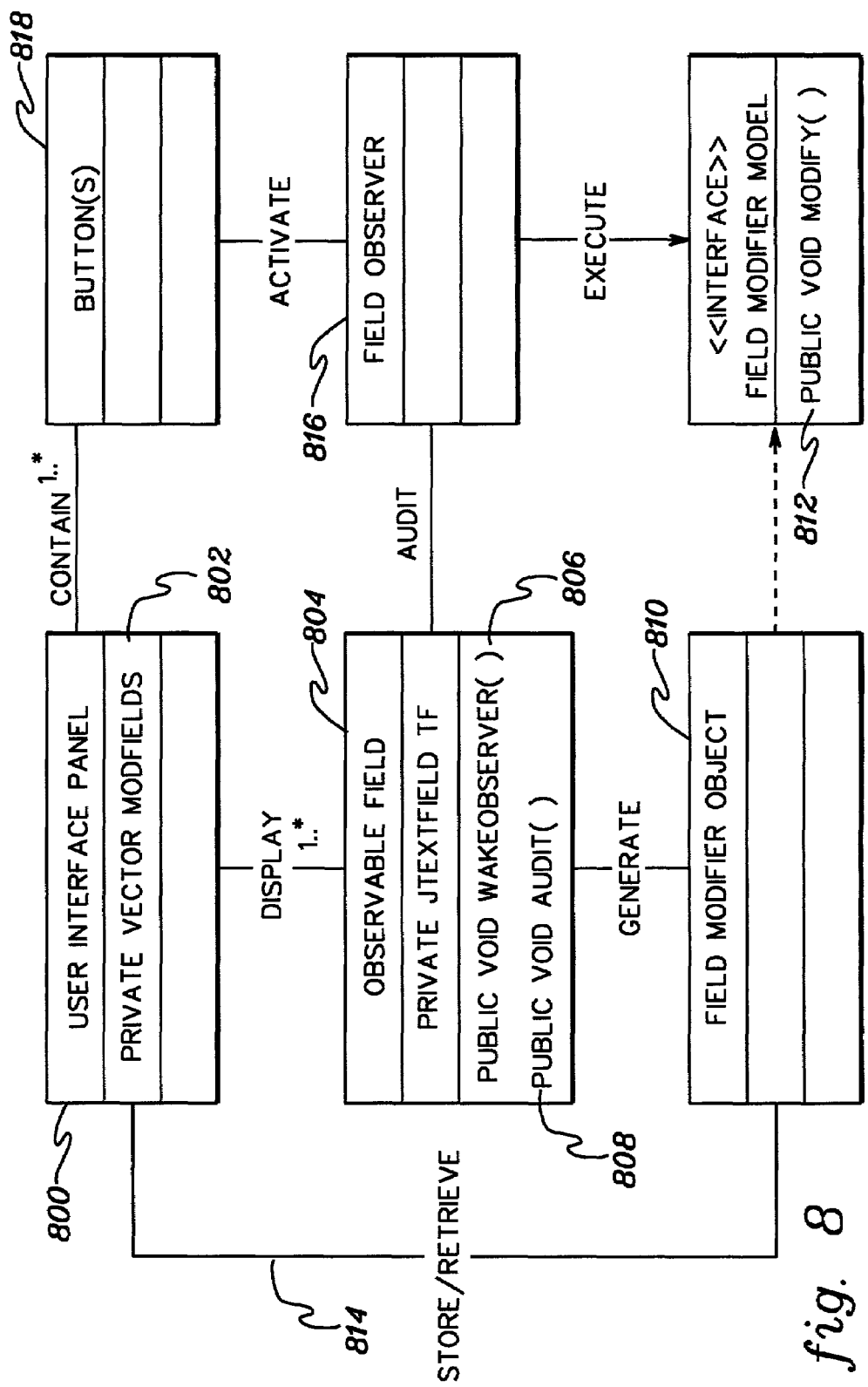
FIG. 8 depicts an overview class diagram of a model used to audit a feature and to effect necessary changes, in accordance with an aspect of the present invention.

An Overview class diagram of the observable/observer model used for aspects of the present invention is depicted in FIG. 8. As shown in FIG. 8, a user interface panel 800 includes one or more fields 802. For each field, there is an observable object 804. The observable object includes a notify method 806 to notify any registered observers of a specified event, and an audit method 808 to check the data of the field. Should a specified event be detected by audit method 808, then a modifier object 810 is generated. The modifier object includes a modify method 812. This method may include a store and/or retrieval 814 of the data to effect the change.

Further, an observer 816 is registered to the observable object. When the modifier object is added to the pool of objects, the observable object notifies the observer. As a further example, a submit button 818 may be used by a user to perform the notification.

Figure 9:
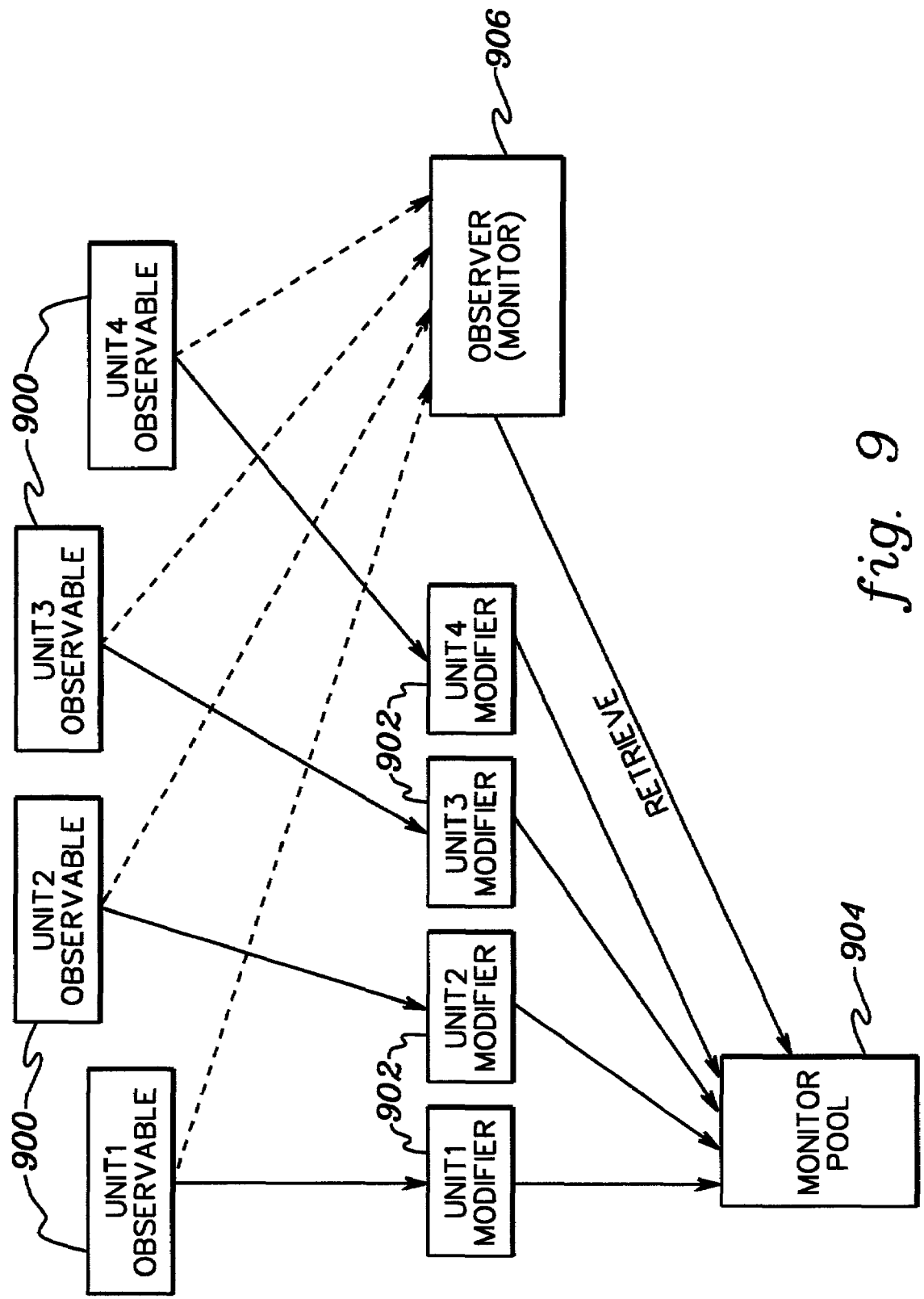
FIG. 9 depicts an overview diagram of the objects associated with auditing the hardware units of FIG. 4, in accordance with an aspect of the present invention.

Another overview diagram is depicted in FIG. 9, which corresponds to the example in which the feature is a component. As depicted in FIG. 9, each component (e.g., a unit or another component, in a further example) to be audited has an observable object 900. Each observable object is used to audit its corresponding component. As an example, each observable object tests one or more operating conditions that are appropriate for its component. If the audit determines that a specified event for a particular unit has occurred, then a modifier object 902 is generated for its corresponding observable object. Further, each modifier object is added to a pool 904.

Moreover, an observer 906 (or a plurality of observers) is notified that modifier objects have been added to the pool. This allows the observer to retrieve objects from the pool.

As described above, in accordance with an aspect of the present invention, an observable object is created for each feature to be audited. In a further embodiment, since each feature is represented by an observable object, a separate observer can be written for testing purposes. This test observer is notified when testing is to be performed. The test observer can perform actions, such as, for instance, displaying the audited data; displaying more detailed information about data entered and what had been changed, for debugging purposes; as well as other actions.

The test observer runs a test method, which is included in a modifier object. That is, in one example, each modifier object has a test method, which provides a mechanism for other types of testing of the data, such as, for instance, value ranges; invalid values; and boundary values. The test observer runs the test method, instead of the modify method, to perform the testing. This allows the capabilities of the present invention to be extendable for testing and debugging.

By having each feature build its own modifier object, the audit requirements are encapsulated in the object (i.e., in the modified method). The observer, in turn, only activates the changes (e.g., changing of data in storage), according to the results of individual audits. In other words, the central point of auditing logic is now distributed into the individual objects.

Thus, one observer can handle a large range of features with one general process. Further, multiple observers can observe the same features. Yet further, many features can be divided and observed by different observers. This provides flexibility and scalability.

Described in detail above is a model that uses observable/observer objects and object pooling techniques to audit features. The model provides a decentralized technique in which the auditing logic is distributed. This eliminates the complex and confusing ad-hoc if-then-else logic currently used. Further, it enables the auditing and observing of many features concurrently and automatically.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of auditing data of data entry forms, said method comprising:
providing a plurality of observable objects, each observable object being provided for a different corresponding field of a plurality of fields of a data entry form to be audited, each said observable object including logic to be used for auditing data of its corresponding field;
auditing data of the plurality of fields using the plurality of observable objects; and
further comprising building a modifier object for a corresponding field, in response to the auditing determining that a specified event related to the corresponding field has occurred.

2. The method of claim 1, wherein the plurality of observable objects provide decentralized locations for auditing the data of the plurality of fields.

3. The method of claim 1, wherein the specified event includes a change in the data of the corresponding field.

4. The method of claim 1, further comprising forwarding the modifier object to a pool of one or more modifier objects.

5. The method of claim 4, further comprising:
retrieving, by an observer, the modifier object from the pool; and
running a modifier method of said modifier object to accommodate the specified event.

6. The method of claim 5, wherein the modifier method comprises a modify method, and running the modify method causes changed data to be stored in a storage medium.

7. The method of claim 5, further comprising informing the observer that the modifier object has been added to the pool of one or more modifier objects.

8. The method of claim 5, wherein the observer is a test observer used for debugging.

9. The method of claim 8, wherein the modifier method comprises a test method used for debugging.

10. The method of claim 1, further comprising automatically building a modifier object for each field of said plurality of fields that includes changed data, as determined by the auditing.

11. The method of claim 1, wherein the plurality of observable objects provide decentralized locations for auditing the data of the plurality of fields, and wherein each observable object includes logic for use in auditing only data of its corresponding field.

12. The method of claim 11, further comprising building a modifier object for a corresponding field, in response to the auditing determining that a specified event related to the corresponding field has occurred, wherein the building comprises automatically generating a modifier object for the corresponding field.

13. The method of claim 12, further comprising registering at least one observer object with the plurality of observable objects, and wherein the method further comprises automatically forwarding each modifier object to a pool of one or more modifier objects, retrieving by the at least one observer object the modified object from the pool, and automatically running a modifier method of the modifier object to accommodate the specified event.

14. The method of claim 13, wherein the at least one observer object comprises a plurality of observer objects, and wherein the method further comprises automatically informing the plurality of observer object that the modifier object has been added to the pool of one or more modifier objects, and wherein the plurality of observer objects collaborate to avoid executing the modifier method of the modifier object multiple times.

15. The method of claim 14, wherein the one or more modifier objects are to be processed in a designated order, and wherein the method further comprises associating a tag with each modifier object to enable the plurality of observer objects to retrieve modifier objects from the pool in a specified order.

16. A method of auditing data of a data entry form, said method comprising:
providing a plurality of observable objects, each observable object being provided for a different corresponding field of a plurality of fields of the data entry form to be audited, each said observable object including logic to be used for auditing data of its corresponding field;
auditing data of the plurality of fields using the plurality of observable objects;
automatically building a modifier object for each corresponding field, in response to the auditing determining that a change has occurred in the data of the corresponding field;
automatically forwarding each modifier object to a pool of one or more modifier objects;
automatically informing an observer object that the modifier object has been added to the pool of one or more modifier objects;
automatically retrieving, by the observer object, the modifier object from the pool; and automatically running, by the observer object, a modify method of the modifier object to accommodate the change in the data of the corresponding field.

17. A method of auditing data of components of a self-monitoring framework, said method comprising:
   providing an observable object for each component of a plurality of components of multiple components of said self-monitoring framework to be audited, each observable object including logic to be used for auditing data of its associated component;
   auditing data of said each component using the observable object corresponding to that component; and
   further comprising building a modifier object for each component of said plurality of components determined by the auditing to have had a specified event for that component occur.

18. The method of claim 17, wherein the specified event for a component is related to one or more operating conditions of the component.

19. The method of claim 17, further comprising forwarding each modifier object to a pool of modifier objects.

20. The method of claim 19, further comprising:
   retrieving, by one or more observers, the one or more modifier objects of the pool; and
   running, by the one or more observers, one or more modify methods of the one or more modifier objects retrieved from the pool to accommodate one or more specified events.

21. A system of auditing data of data entry forms, said system comprising:
   means for providing a plurality of observable objects, each observable object being provided for a different corresponding field of a plurality of fields of a data entry form to be audited, each said observable object including logic to be used for auditing data of its corresponding field;
   means for auditing data of the plurality of fields using the plurality of observable objects; and
   further comprising means for building a modifier object for a corresponding field, in response to the auditing determining that a specified event relating to the corresponding field has occurred.

22. The system of claim 21, wherein the observable objects provide decentralized locations for auditing the data of the plurality of fields.

23. The system of claim 21, wherein the specified event includes a change in the data of the corresponding field.

24. The system of claim 21, further comprising means for forwarding the modifier object to a pool of one or more modifier objects.

25. The system of claim 24, further comprising:
   means for retrieving, by an observer, the modifier object from the pool; and
   means for running a modifier method of said modifier object to accommodate the specified event.

26. The system of claim 25, wherein the modifier method comprises a modify method, and the modify method causes changed data to be stored in a storage medium.

27. The system of claim 25, further comprising means for informing the observer that the modifier object has been added to the pool of one or more modifier objects.

28. The system of claim 25, wherein the observer is a test observer used for debugging.

29. The system of claim 28, wherein the modifier method comprises a test method used for debugging.

30. The system of claim 21, further comprising means for automatically building a modifier object for each field of said plurality of fields that includes changed data, as determined by the auditing.

31. A system of auditing data of a data entry form, said system comprising:
   means for providing a plurality of observable objects, each observable object being provided for a different corresponding field of a plurality of fields of the data entry form to be audited, each said observable object including logic to be used for auditing data of its corresponding field;
   means for auditing data of the plurality of fields using the plurality of observable objects;
   means for automatically building a modifier object for each corresponding field, in response to the auditing determining that a change has occurred in the data of the corresponding field;
   means for automatically forwarding each modifier object to a pool of one or more modifier objects;
   means for automatically informing an observer object that the modifier object has been added to the pool of one or more modifier objects;
   means for automatically retrieving, by the observer object, the modifier object from the pool; and
   means for automatically running, by the observer object, a modify method of the modifier object to accommodate the change in the data of the corresponding field.

32. A system of auditing data of components of a self-monitoring framework, said system comprising:
   means for providing an observable object for each component of a plurality of components of multiple components of said self-monitoring framework to be audited, each observable object including logic to be used for auditing data of its associated component;
   means for auditing data of said each component using the observable object corresponding to that component; and
   further comprising means for building a modifier object for each component of said plurality of components determined by the auditing to have had a specified event for that component occur.

33. The system of claim 32, wherein the specified event for a component is related to one or more operating conditions of the component.

34. The system of claim 32, further comprising means for forwarding each modifier object to a pool of modifier objects.

35. The system of claim 34, further comprising:
   means for retrieving, by one or more observers, the one or more modifier objects of the pool; and
   means for running, by the one or more observers, one or more modify methods of the one or more modifier objects retrieved from the pool to accommodate one or more specified events.

36. A system of auditing data of a data entry form, said system comprising:
   a plurality of observable objects, each observable object being provided for a different corresponding field of a plurality of fields of the data entry form to be audited, each said observable object including auditing logic for auditing data of its corresponding field;
   a modifier object automatically built for each corresponding field, in response to the auditing logic determining that a change has occurred in the data of the corresponding field;

a pool of one or more modifier objects to receive each modifier object; and an observer informed that the modifier object has been added to the pool of one or more modifier objects, wherein the observer retrieves the modifier object from the pool, and runs a modify method of the modifier object to accommodate the change in the data of the corresponding field.

37. At least one program storage device readable by a machine, tangibly embodying at least one program of instructions executable by the machine to perform a method of auditing data of data entry forms, said method comprising:

providing a plurality of observable objects, each observable object being provided for a different corresponding field of a plurality of fields of a data entry form to be audited, each said observable object including logic to be used for auditing data of its corresponding field;

auditing data of the plurality of fields using the plurality of observable objects; and wherein said method further comprises building a modifier object for a corresponding field, in response to the auditing determining that a specified event related to the corresponding field has occurred.

38. The at least one program storage device of claim 37, wherein the plurality of observable objects provide decentralized locations for auditing the data of the plurality of fields.

39. The at least one program storage device of claim 37, wherein the specified event includes a change in the data of the corresponding field.

40. The at least one program storage device of claim 37, wherein said method further comprises forwarding the modifier object to a pool of one or more modifier objects.

41. The at least one program storage device of claim 40, wherein said method further comprises:

retrieving, by an observer, the modifier object from the pool; and running a modifier method of said modifier object to accommodate the specified event.

42. The at least one program storage device of claim 41, wherein the modifier method comprises a modify method, and running the modify method causes changed data to be stored in a storage medium.

43. The at least one program storage device of claim 41, wherein said method further comprises informing the observer that the modifier object has been added to the pool of one or more modifier objects.

44. The at least one program storage device of claim 41, wherein the observer is a test observer used for debugging.

45. The at least one program storage device of claim 44, wherein the modifier method comprises a test method used for debugging.

46. The at least one program storage device of claim 37, wherein said method further comprises automatically building a modifier object for each field of said plurality of fields that includes changed data, as determined by the auditing.

47. At least one program storage device readable by a machine, tangibly embodying at least one program of instructions executable by the machine to perform a method of auditing data of a data entry form, said method comprising:

providing a plurality of observable objects, each observable object being provided for a different corresponding field of a plurality of fields of the data entry form to be audited, each said observable object including logic to be used for auditing data of its corresponding field;

auditing data of the plurality of fields using the plurality of observable objects;

automatically building a modifier object for each corresponding field, in response to the auditing determining that a change has occurred in the data of the corresponding field;

automatically forwarding each modifier object to a pool of one or more modifier objects;

automatically informing an observer object that the modifier object has been added to the pool of one or more modifier objects;

automatically retrieving, by the observer object, the modifier object from the pool; and automatically running, by the observer object, a modify method of the modifier object to accommodate the change in the data of the corresponding field.

48. At least one program storage device readable by a machine, tangibly embodying at least one program of instructions executable by the machine to perform a method of auditing data of components of a self-monitoring framework, said method comprising:

providing an observable object for each component of a plurality of components of multiple components of said self-monitoring framework to be audited, each observable object including logic to be used for auditing data of its associated component;

auditing data of said each component using the observable object corresponding to that component; and wherein said method further comprises building a modifier object for each component of said plurality of components determined by the auditing to have had a specified event for that component occur.

49. The at least one program storage device of claim 48, wherein the specified event for a component is related to one or more operating conditions of the component.

50. The at least one program storage device of claim 48, wherein said method further comprises forwarding each modifier object to a pool of modifier objects.

51. The at least one program storage device of claim 50, wherein said method further comprises:

retrieving, by one or more observers, the one or more modifier objects of the pool; and running, by the one or more observers, one or more modify methods of the one or more modifier objects retrieved from the pool to accommodate one or more specified events.

* * * * *